(12) United States Patent
Marusca et al.

(10) Patent No.: US 8,730,834 B2
(45) Date of Patent: May 20, 2014

(54) INTELLIGENT ELECTRONIC DEVICE WITH EMBEDDED MULTI-PORT DATA PACKET CONTROLLER

(75) Inventors: Ioan Marusca, Richmond Hill (CA); Michael Pilon, Markham (CA); Bogdan Z. Kasztenny, Markham (CA); Jeffrey Glenn Mazereeuw, New Market (CA)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 11/317,477

(22) Filed: Dec. 23, 2005

(65) Prior Publication Data
US 2007/0147415 A1 Jun. 28, 2007

(51) Int. Cl.
*H04L 12/28* (2006.01)
(52) U.S. Cl.
USPC .......................................... 370/254; 370/419
(58) Field of Classification Search
USPC .................. 370/214, 242, 252, 257, 256, 258
See application file for complete search history.

(56) References Cited

U.S. PATENT DOCUMENTS

| 4,957,690 | A | 9/1990 | Fennern | |
|---|---|---|---|---|
| 6,266,713 | B1 | 7/2001 | Karanam et al. | |
| 6,285,917 | B1 | 9/2001 | Sekiguchi et al. | |
| 6,301,527 | B1 | 10/2001 | Butland et al. | |
| 6,313,752 | B1 | 11/2001 | Corrigan et al. | |
| 6,496,935 | B1* | 12/2002 | Fink et al. | 726/13 |
| 6,553,418 | B1 | 4/2003 | Collins et al. | |
| 6,671,635 | B1* | 12/2003 | Forth et al. | 702/61 |
| 6,751,562 | B1* | 6/2004 | Blackett et al. | 702/61 |
| 6,792,337 | B2* | 9/2004 | Blackett et al. | 700/295 |
| 7,096,310 | B2 | 8/2006 | Norden | |
| 7,342,873 | B1* | 3/2008 | Nagarajan | 370/217 |
| 2007/0067132 | A1* | 3/2007 | Tziouvaras et al. | 702/122 |
| 2009/0116405 | A1* | 5/2009 | Hakala-Ranta et al. | 370/254 |

\* cited by examiner

*Primary Examiner* — Yemane Mesfin
*Assistant Examiner* — Mon Cheri Davenport
(74) *Attorney, Agent, or Firm* — GE Global Patent Operation; Catherine J. Toppin

(57) ABSTRACT

An intelligent electronic device (IED) configured to supervise a process having a state has at least one of a current, voltage or resistive input configured to monitor the state of the process, a binary status input configured to monitor the state of the process, a binary status input configured to receive a digitally encoded serial communication package for monitoring the state of the process, a control output configured to output a signal to control process protection, control, or automation, or a combination thereof, or a control output configured to output a digitally encoded serial communication package to control protection, control, or automation, or a combination thereof. The IED is also configured to facilitate digital communication between at least two compatible devices by directing communication packets from ports connected to an originating compatible device to ports connected to a destination compatible device.

19 Claims, 6 Drawing Sheets

INTELLIGENT ELECTRONIC DEVICE WITH EMBEDDED MULTI-PORT DATA PACKET CONTROLLER

BACKGROUND OF THE INVENTION

This invention relates generally to Intelligent Electronic Devices (IEDs) suitable for power system protection, control, monitoring and/or automation, and more particularly, to IEDs configured to facilitate communication within a group of compatible devices.

Various known electric power systems are spread over large geographical areas. These systems span from power generating stations through extra high voltage transmission facilities, to medium voltage distribution networks and electric loads. Components in such systems are constantly monitored by a plurality of devices to ensure continuous delivery of electric power. Known monitoring devices perform functions such as protection of assets, system protection, control, monitoring, recording, and/or metering. For example, a monitoring device may:

initiate the disconnection of an asset in case of an internal failure or of system conditions that jeopardize the asset, initiate a disconnect of loads and/or generators to protect the integrity of the power system as a whole, initiate an adjustment of parameters of processes for optimum operation of an asset or the power system as a whole, measure and/or store an indication of system operating parameters, and/or signal an alarm with respect thereto, produce a time record of system parameters for post-mortem analysis, and/or measure parameters of the system for operation and/or revenue purposes.

Some of these monitoring devices have been developed using microprocessor-based technology, and are thus referred to herein as Intelligent Electronic Devices, or IEDs.

In the past few years, microprocessor-based protection and control devices as well as instrument transformers from which the protection and control devices get their key inputs have been developed that work with power system signals in the form of digital data packets exchanged over communication channels. Such communication channels include, for example, direct point-to-point fiber optic connections, optical or electrical based Ethernet, and optical or electrical serial ports. Data exchanged between IEDs (peer-to-peer) and IEDs and higher order systems such as Supervisory Control and Data Acquisition (SCADA) systems include status (on/off, healthy/faulty, enabled/disabled, etc.), metered values (voltage, current, power, frequency, temperature), sampled values (instantaneous currents and voltages), records (oscillographic files, logs, etc.), set-points and other data controlling operation of the devices (setting files, firmware/executable files), commands (open/close, etc.), and other.

Data sharing is provided between a plurality of monitoring devices can provide flexible and efficient communication. For example, data can be multiplexed on a common physical channel such as a copper wire. As another example, an external device can be used to physically separate communicating devices while moving buffered data between any two of the devices and redirecting data packets between an originating device and a destination device(s).

In at least one known configuration of a communication system for protection, automation or control and referring to prior art FIG. 1, an external communication switch enables communication between IEDs in a network 40. The physical media 30, 31, 32, 33 used is fiber optic or copper wire. IED 10 comprises a communication port 20 and uses a connection 30 to connect to a communication exchanger 14. IED 11 comprises a communication port 21 and uses a connection 31 to connect to communication exchanger 14. IED 12 comprises a communication port 22 and uses a connection 32 to connect to communication exchanger 14. IED 13 comprises a communication port 23 and uses a connection 33 to connect to communication exchanger 14. Additional communication ports 35 may be available to connect more devices. Connection to a network of devices is possible using communication port 34.

The use of the Ethernet standard and the IP protocol to transfer and share data between protective relays and/or IEDs has spread in the field of protection, automation and control. Communication switching devices ("switches") have impact on the reliability and the cost of the system. The use of a switch such as communication exchanger 14 increases the cost and complexity of the network and reduces reliability unless single points of failure are eliminated by duplicating the entire communication network, which would increase the cost and complexity of the network even further.

BRIEF DESCRIPTION OF THE INVENTION

The present invention, in one aspect, therefore provides an intelligent electronic device (IED) configured to supervise a process having a state. The IED also has at least one of a current, voltage or resistive input configured to monitor the state of the process, a binary status input configured to monitor the state of the process, a binary status input configured to receive a digitally encoded serial communication package for monitoring the state of the process, a control output configured to output a signal to control process protection, control, or automation, or a combination thereof, or a control output configured to output a digitally encoded serial communication package to control protection, control, or automation, or a combination thereof. The IED is also configured to facilitate digital communication between at least two compatible devices by directing communication packets from ports connected to an originating compatible device to ports connected to a destination compatible device.

In another aspect, the present invention provides a network that includes a plurality of communicating devices. The network also includes at least one intelligent electronic device (IED) that supervises a process having a state. Each of the IEDs further has at least one of a current, voltage or resistive input configured to monitor the state of the process, a binary status input configured to monitor the state of the process, a binary status input configured to receive a digitally encoded serial communication package for monitoring the state of the process, a control output configured to output a signal to control process protection, control, or automation, or a combination thereof, or a control output configured to output a digitally encoded serial communication package to control protection, control, or automation, or a combination thereof. Each of the IEDs is further configured to facilitate digital communication between at least two compatible devices by directing communication packets from ports connected to an originating compatible device to ports connected to a destination compatible device.

It will be appreciated from the detailed description that an improvement in reliability as well as providing increased electrical noise immunity, reduced overall space, reduced wiring complexity and reduced overall cost of installation can be achieved by various configurations of the present invention. These advantages are especially useful in power protection, automation and control systems, for which reliability is a critical factor. An embedded communication exchanger increases the reliability of such systems by minimizing or at least reducing the number of devices and modules needed.

IEDs are designed and manufactured for increased immunity to electrical and magnetic fields and transients. Embedding a Communication Exchanger into an IED can thereby improves the immunity of the exchanger to electrical and magnetic fields and transients. Furthermore, the amount of physical space available for power protection, automation and control systems is limited. By embedding a communication exchanger into an IED, a reduction of total space used for the system and wiring complexity can be achieved.

DETAILED DESCRIPTION OF THE INVENTION

Configurations of the present invention described herein refer to the Ethernet and to the IP protocol. However, it shall be understood that configurations of the present invention are not limited to Ethernet and/or IP. Instead, configurations of the present invention can use or be applied to any communication system that shares a physical medium by separating communicating devices and switching data packets between the devices to channel outgoing and incoming messages.

Some configurations of the present invention utilize an embedded communication exchanger module, card, or component of an IED for protection, automation, control or metering. The use of an embedded communication exchanger provides an improvement in reliability as well as providing increased electrical noise immunity, reduced overall space, reduced wiring complexity and reduced overall cost of installation. These advantages are especially useful in power protection, automation and control systems, for which reliability is a critical factor. An embedded communication exchanger increases the reliability of such systems by minimizing or at least reducing the number of devices and modules needed.

IEDs are designed and manufactured for increased immunity to electrical and magnetic fields and transients. Embedding a Communication Exchanger into an IED can thereby improve the immunity of the exchanger to electrical and magnetic fields and transients. Furthermore, the amount of physical space available for power protection, automation and control systems is limited. By embedding a communication exchanger into an IED, a reduction of total space used for the system and wiring complexity can be achieved.

Different topologies are possible for the communication architecture of a network of IEDs depending upon the manner in which information flows between devices. Therefore, various configurations of the present invention provide a communication exchanger that supports architectures that include, but are not necessarily limited to:

a communication network with a star architecture and that exchanges information only between physical peers;

a daisy chain architecture in which each device is directly connected to a maximum of two other devices; and/or a ring architecture in which each IED is connected to 2 other IEDs.

In various configurations of the present invention, two or more communication ports are handled by an embedded communication exchanger. The present invention does not place any specific limit on the maximum number of communication ports that can or must be handled by an embedded communication exchanger.

Figure 1:
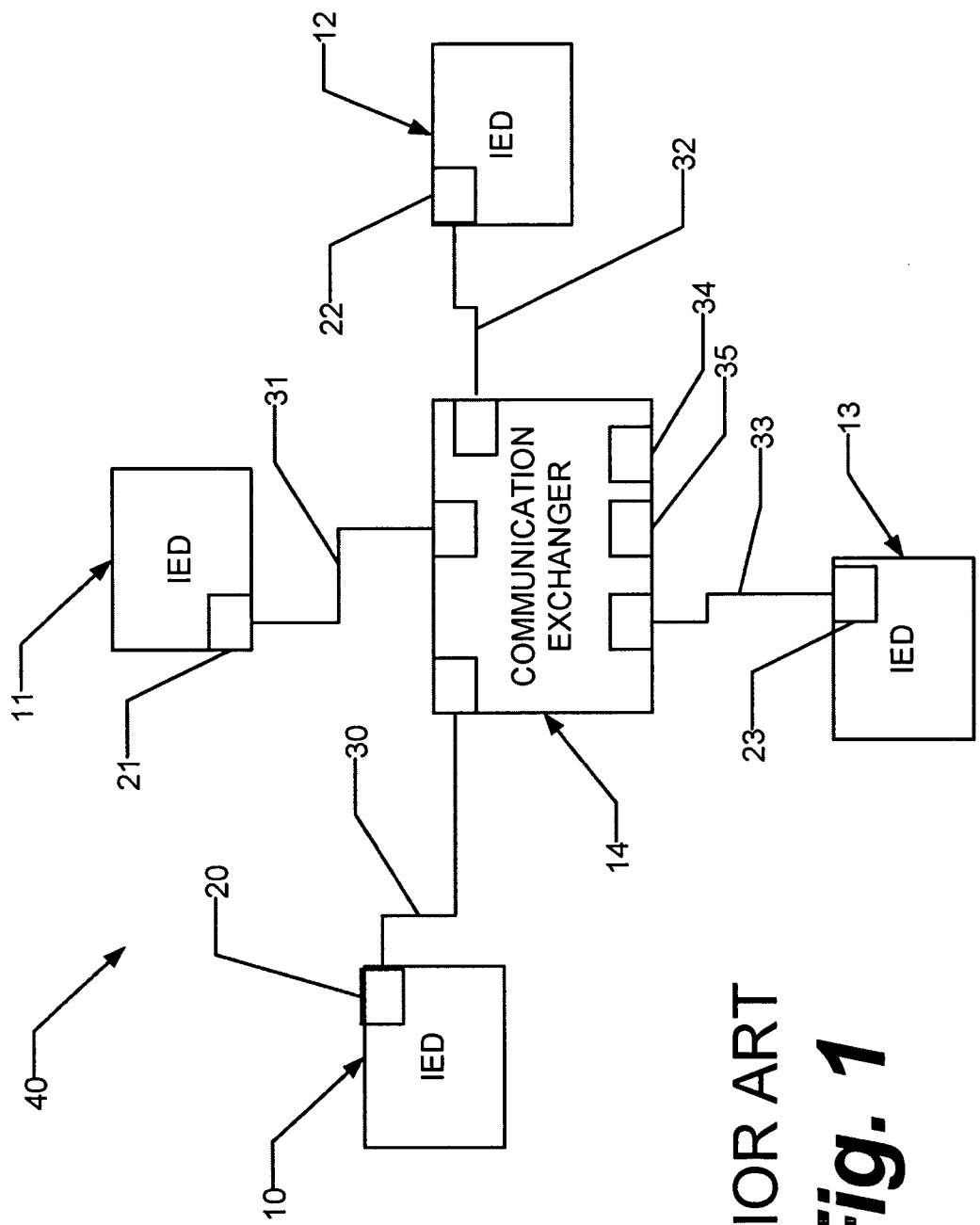
FIG. 1 is a block diagram of a connection of prior art IEDs using an external Communication Exchanger.
Figure 2:
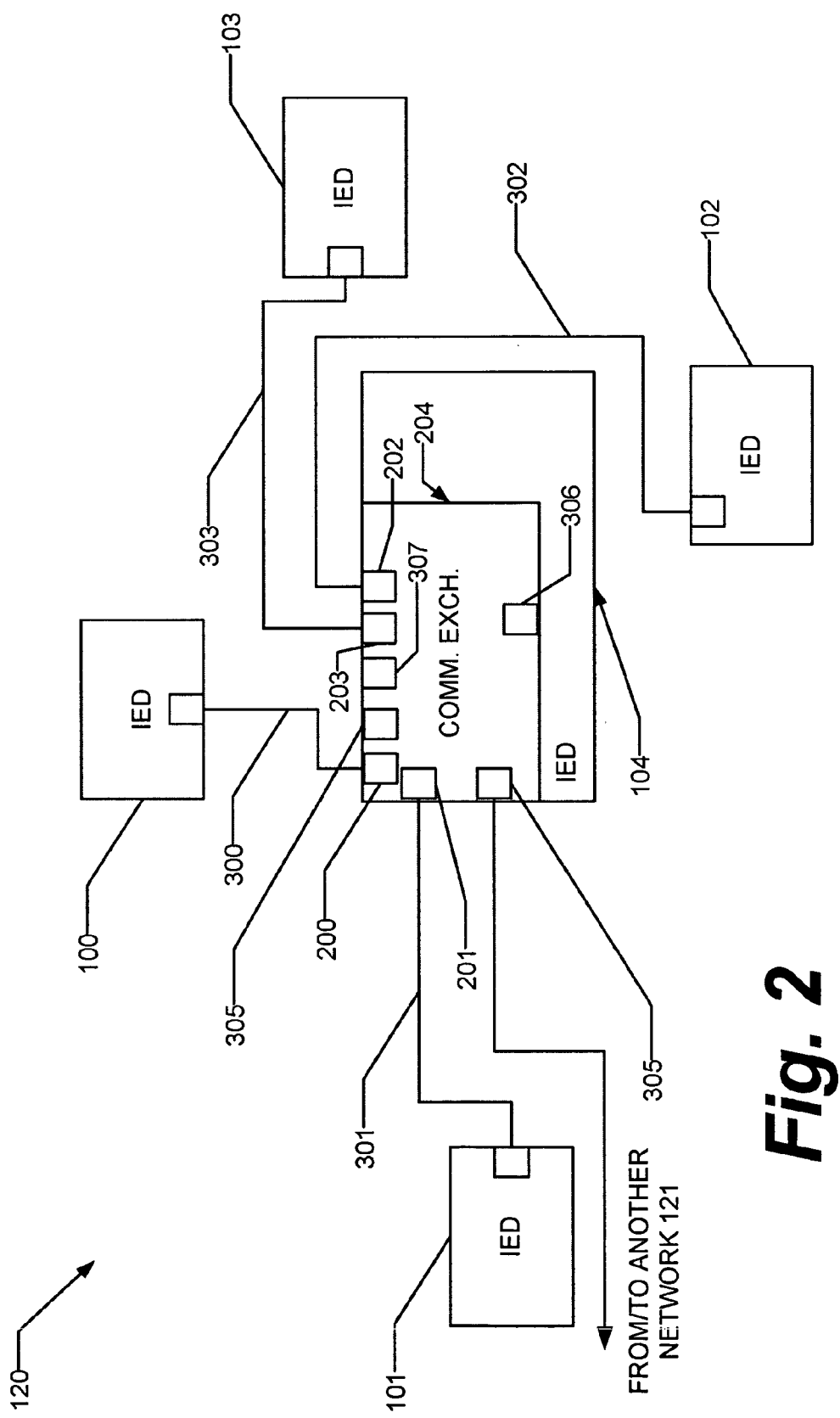
FIG. 2 is a block diagram of a star topology of IED configurations of the present invention using embedded Communication Exchanger.

In some configurations of the present invention and referring to the block diagram of FIG. 2, a plurality of IEDs 100, 101, 102, 103 and 104 are provided in a star network 120. Using connection 300 and port 200, IED 100 is connected to embedded communication exchanger 204. Using connection 302 and port 202, IED 102 is connected to embedded communication exchanger 204. IED 104 has direct access to communication exchanger 204 using internal communication port 306 or an external communication port 307. Using connection 301 and port 201, IED 101 is connected to embedded communication exchanger 204. Using connection 303 and port 203, IED 103 is connected to embedded communication exchanger 204. In the illustrated configuration, communication exchanger 204 is embedded in IED 104, and is physically contained in IED 104. Communication exchanger 204 can have additional communication ports 305, to which other devices are connected, and exchanger 204 can also be connected another network 121. This configuration requires a minimum number of connections.

Figure 3:
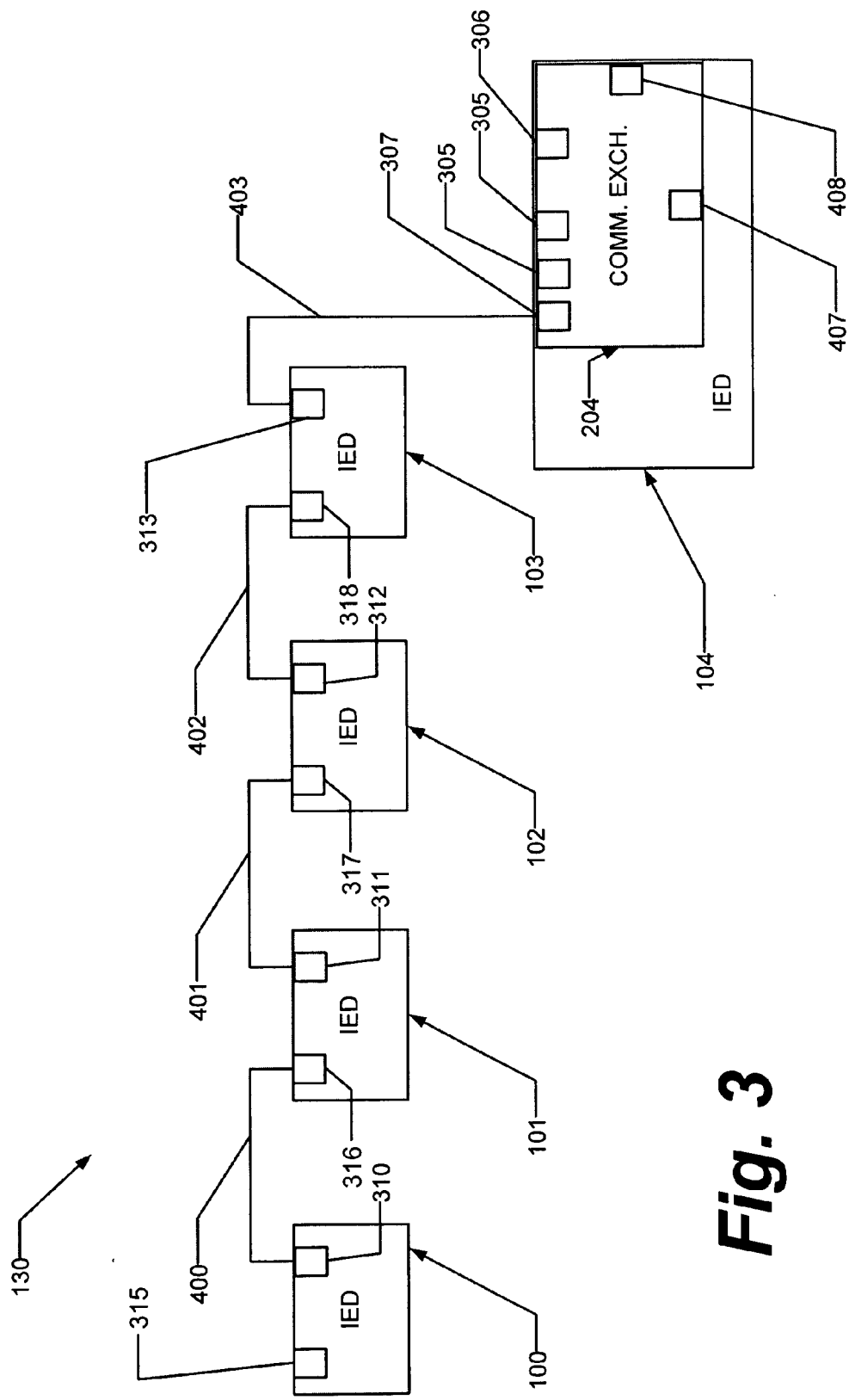
FIG. 3 is a block diagram of a daisy chain topology of IED configurations of the present invention using embedded Communication Exchanger.

In some configurations of the present invention and referring to the block diagram of FIG. 3, a daisy chain network 130 of IEDs is provided. Devices 100, 101, 102, 103 and 104 are IEDs. IED 100 has communication ports 315 and 310. IED 101 has communication ports 316 and 311. IED 102 has communication ports 317 and 312. IED 103 has communication ports 318 and 313. IED 104 has direct access to communication exchanger 204 using an internal connection 407 or an external connection 408. Port 310 of IED 100 is connected to port 316 of IED 101 using connection 400. Port 311 of IED 101 is connected to port 317 of IED 102 using connection 401. Port 312 of IED 102 is connected to port 318 of IED 103 using connection 402. Port 313 of IED 103 is connected to port 307 of IED 104 using connection 403. IED 104 incorporates communication exchanger 204, which is physically contained in IED 104. Additional communication ports 305 are available in some configurations to connect more devices. Also, connection to a network of devices is possible using port 306. This configuration requires a minimal number of ports at communication exchanger 204.

Figure 4:
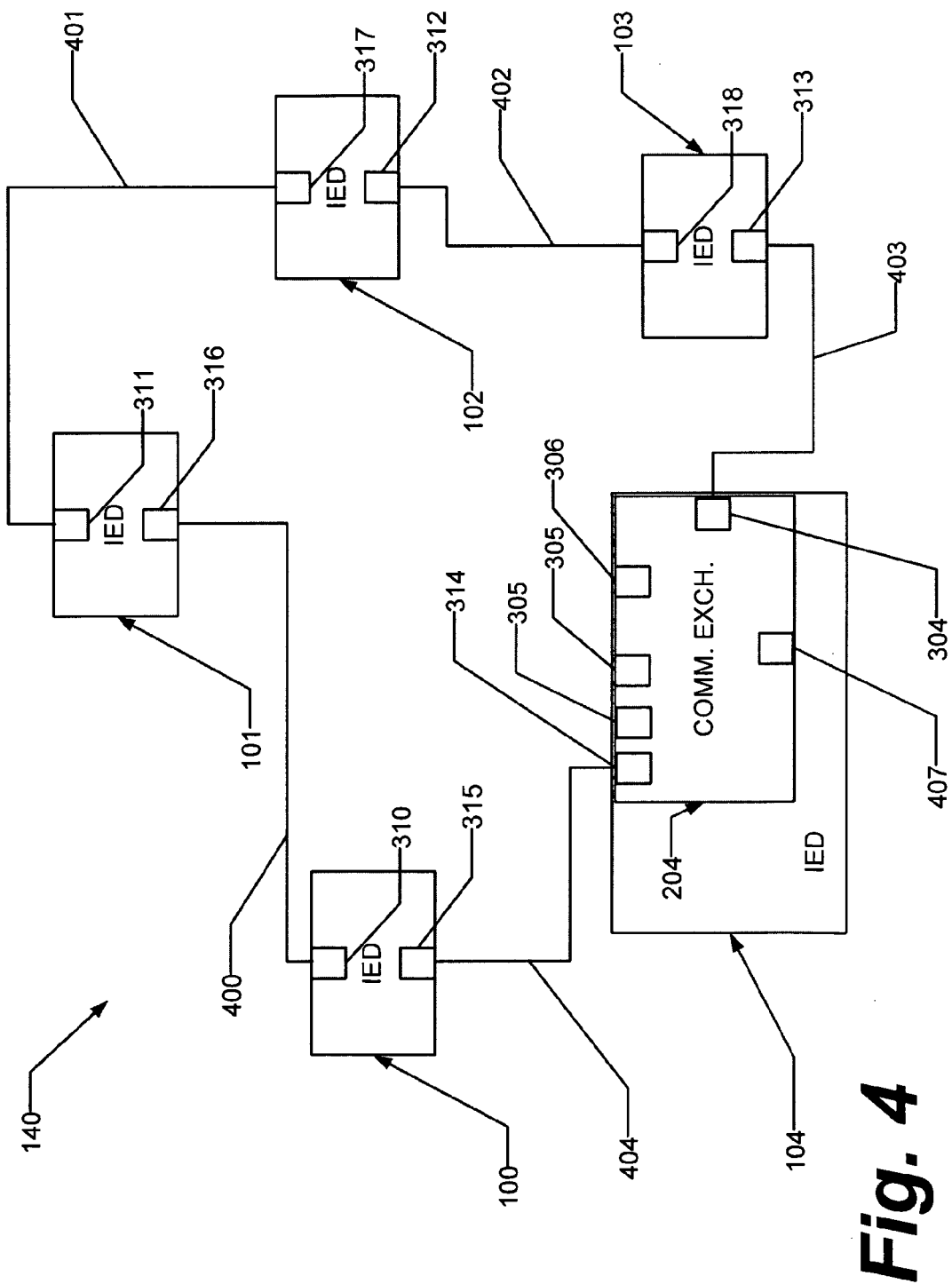
FIG. 4 is a block diagram of a ring topology of IED configurations of the present invention using embedded Communication Exchanger.

In some configurations of the present invention and referring to FIG. 4, a ring network 140 of IEDs is provided. Devices 100, 101, 102, 103 and 104 are IEDs. IED 100 has communication ports 315 and 310. IED 101 has communication ports 316 and 311. IED 102 has communication ports 317 and 312. IED 103 has communication ports 318 and 313. IED 104 has direct access to communication exchanger 204 using internal connection 407 or external connection 408. Port 310 of IED 100 is connected to port 316 of LE-DIED 101 using connection 400. Port 311 of IED 101 is connected to port 317 of IED 102 using connection 401. Port 312 of IED 102 is connected to port 318 of IED 103 using connection 402. Port 313 of IED 103 is connected to a port 304 of embedded communication exchanger 204 using connection 403. Port 315 of IED 100 is connected to a port 314 of embedded communication exchanger 204 using connection 404. IED 104 incorporates a communication exchanger 204, which is physically contained in IED 104. Additional ports 305 are available in some configurations to connect more devices. Also, a connection to a network is possible using port 306. In this configuration, information can circulate in the shortest path, while one point of failure on the ring can be tolerated without loss of functionality. Thus, the network is self-healing.

Figure 5:
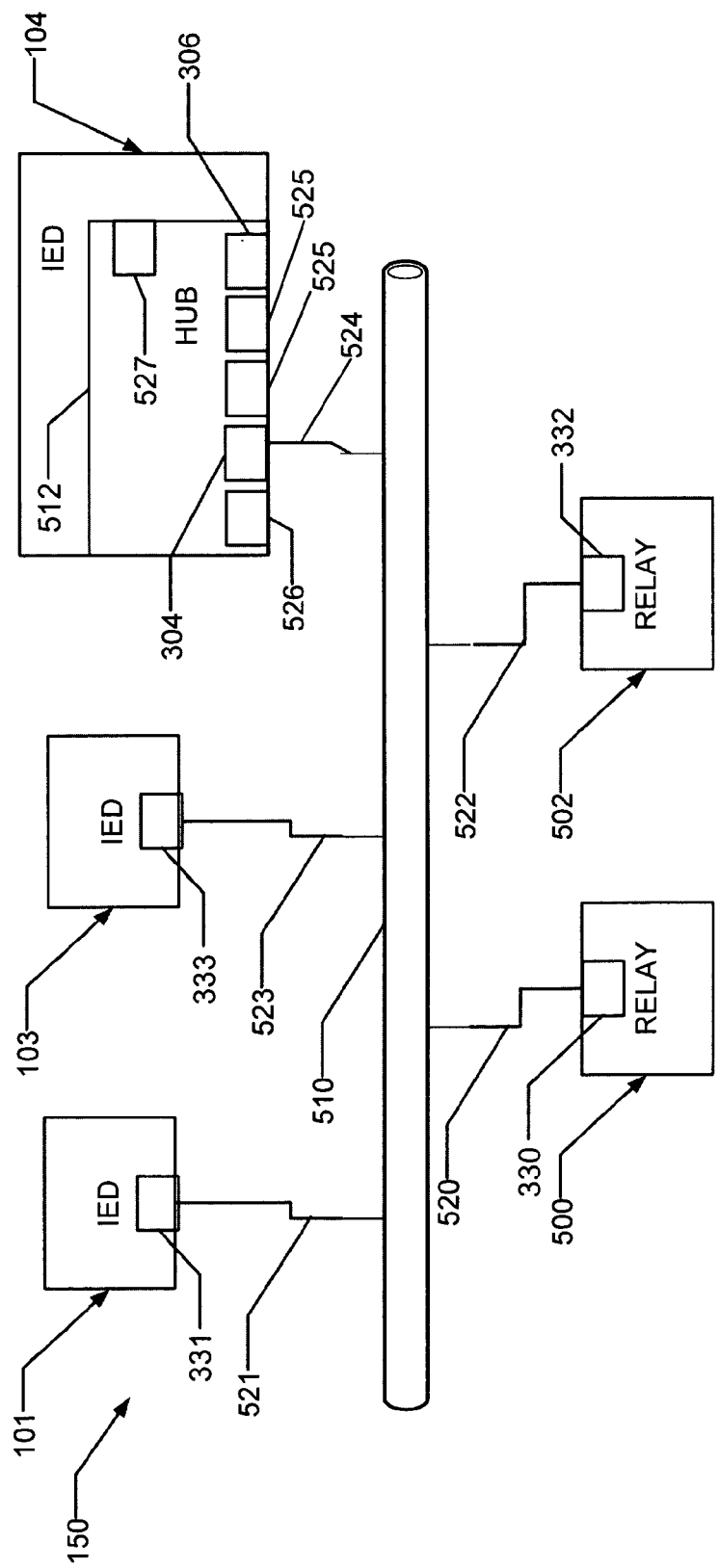
FIG. 5 is a block diagram showing protective relays and IEDs in a network that share a single physical medium.

In some configurations of the present invention and referring to FIG. 5, protective relays and IEDs are provided in a network 150 and that share a single physical medium 510. For example, devices 500, 502 in some configurations are protective relays, and devices 101, 103 and 104 are IEDs. Protective relay 500 has Ethernet interface 520 and Ethernet ports 300. Relay 100 connects to shared physical media 510. IED 101 has Ethernet interface 521 and Ethernet ports 301. IED 101 connects to shared physical media 510. Protective relay 502 has Ethernet interface 522 and Ethernet ports 302. Relay 502 connects to shared physical media 510. IED 103 has Ethernet interface 523 and Ethernet ports 303. IED 103 connects to shared physical media 510. IED 104 has direct access to Ethernet switch or hub 512 using internal connection 402, or external access using external connection 526, or shares physical media 510 with protective relay 500, IED 101, protective relay 502 and IED 103. Additional ports 525 are available in some configurations to connect more devices. Ethernet switch or hub 512 is physically contained in the protective relay or IED 104 using Ethernet interface 524 and Ethernet port 304. Connection to a LAN is possible using port 306. This configuration uses the minimum number of ports on Ethernet switch or hub 204 although it provides reduced communication bandwidth.

Figure 6:
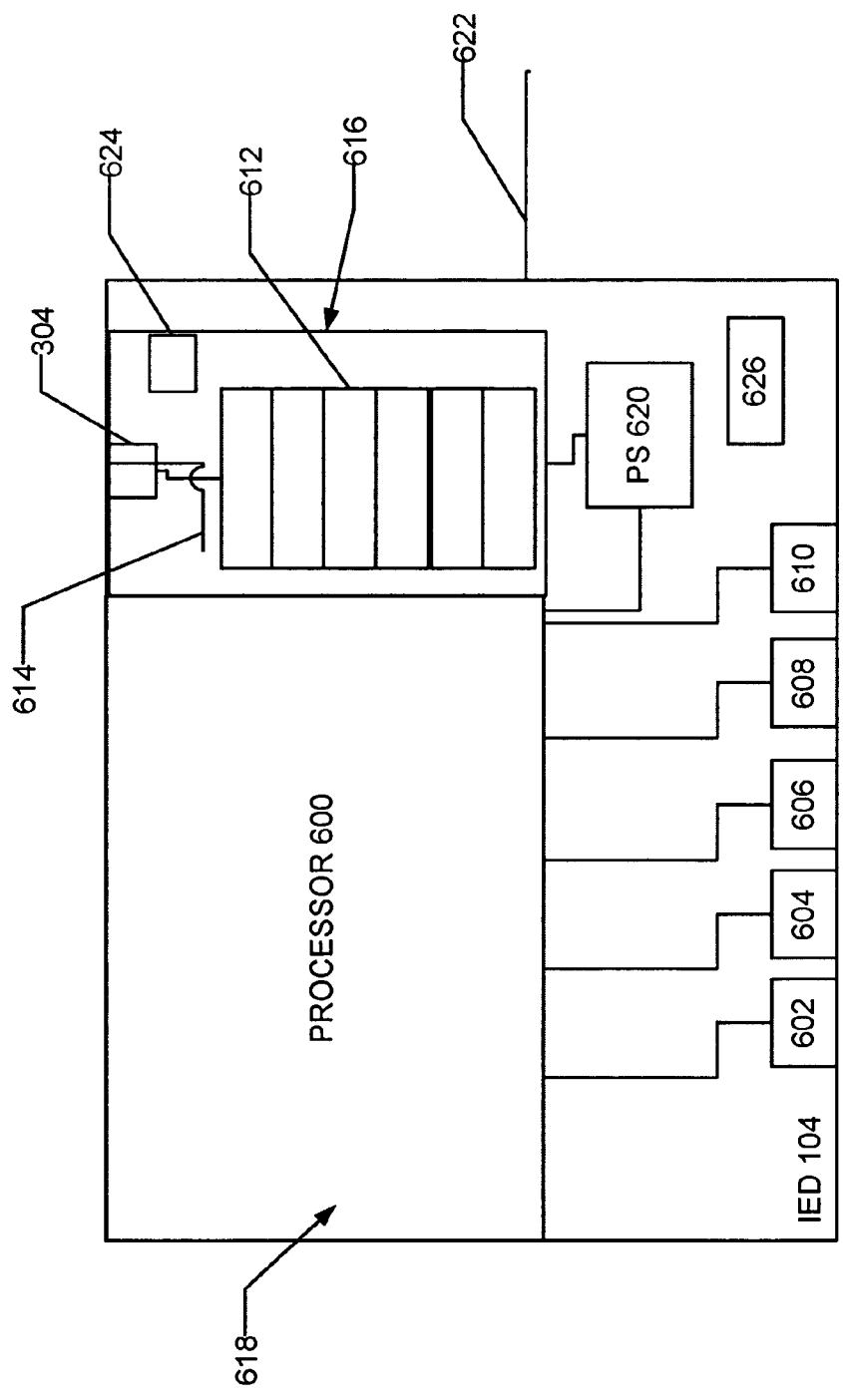
FIG. 6 is a block diagram showing an IED configured to monitor a state of a process to provide protection, control, or automation of a network.

In some configurations of the present invention and referring to FIG. 6, an IED (for example, IED 104, which will be referred to for the sake of convenience below) is configured to monitor a state of a process to provide protection, control, or automation of a network. Thus, in some configurations, IED 104 comprises a processor 600 that is configured to monitor a signal indicative of a state of a process and to control this process. For these purposes, IED 104 is provided with any one or more of the following inputs and/or outputs:

a) at least one current, voltage, or resistive input 602;

b) at least one binary status input 604 monitoring, for example, a high/low voltage state;

c) at least one binary status input 606 configured to monitor a digitally encoded serial communication package received over media and using a protocol;

d) at least one control output 608, either digital or analog in the form of a physical output signal (for example, a resistance, voltage, or current) that can be used to manipulate the process being monitored, but excluding the health status of IED 104 itself; and/or e) at least one control output 610, either digital or analog in the form of a digitally encoded serial communication package transmitted over media and using a protocol, and which can be used to manipulate the process being monitored, but excluding the health status of IED 104 itself.

IED 104 is also configured to facilitate digital communication between at least two compatible devices (e.g., IEDs 103 and 104 in FIG. 5) by directing communication packets from ports such as port 333 connected to IED 103 to ports such as port 304 connected to IED 104. IED 103 is an originating device and IED 104 is a destination device. IEDs 103 and 104 can be connected by a compatible network in some configurations, or connected directly to IED 104. The invention places no inherent limitation on the media or on the protocols used to communicate, and communication between IEDs can utilize addressing information carried by the packets themselves, as is the case, for example, with Ethernet. In some configurations of the present invention, IED 104 also contains a buffer 612 to buffer received packets before sending them, if a destination port is busy. Also in some configurations, IED 104 is configured to include a priority tag to allow packets with higher priority to be elevated in buffer 612 while waiting for transmission.

The present invention places no limit on the type of port provided on the IEDs or communicating devices. For example, either electrical ports, optical ports, or wireless ports can be provided, either exclusively or in any combination. Electrical ports can be dedicated or shared with other connected signals, which may include but are not limited to a line or lines 614 that supply power to IED 104 itself.

In some configurations of IED 104, packet directing circuitry 616 that facilitates communication between devices is separate from circuitry 618 performing other functions of IED 104, so that circuits 616 and 618 can function independently of one another should the other circuit fail. Power for packet directing circuitry 616 can be provided by an internal power supply 620 within IED 104, independent power supply lines 622, lines 614 of one or more electrical ports of IED 104, or a combination of these sources. Packet directing circuitry 616 can be internal to IED 104. Memory 624 for packet directing circuitry 616 can be provided that contains software or firmware code that can be modified without modifying software or firmware controlling circuitry 618. This code, or circuitry 616 itself, or a combination thereof, can allow a communication port to carry encrypted information, encrypt the information itself, and/or manage security of the encrypted information. Also, some configurations of the present invention alter a transmit signal for a given port in response to a failure of the receive signal for that port, to force a connected IED to switch its transmission to an alternate port. The communication media for the various communication ports can be different, as is also the case for the protocols used thereon. For example, Ethernet, RS422, RS485, G.703, point-to-point fiber, or multiplexed fiber using the IEEE C37.94 standard can be used. In some cases, IED 104 is configured so that destination packets can include more than one compatible IED.

In some configurations of the present invention, IED 104 also includes an internal clock 626, which may be, for example, a time and date clock, a sampling clock, or both. Ports connecting IED 104 to other IEDs can be used to synchronize internal clock 626. However, the invention does not necessarily restrict the synchronization of clock 626 to signals received by ports. For example, in other configurations, the synchronizing signal is internally generated by IED 104, connected externally by a physical signal, acquired via a wireless signal, or via one of the communication ports, or any combination thereof.

It will thus be appreciated that configurations of the present invention provide an improvement in reliability as well as providing increased electrical noise immunity, reduced overall space, reduced wiring complexity and reduced overall cost of installation. These advantages are especially useful in power protection, automation and control systems, for which reliability is a critical factor. An embedded communication exchanger increases the reliability of such systems by minimizing or at least reducing the number of devices and modules needed.

Moreover, IEDs are designed and manufactured for increased immunity to electrical and magnetic fields and transients. Embedding a Communication Exchanger into an IED can thereby improves the immunity of the exchanger to electrical and magnetic fields and transients. Furthermore, the amount of physical space available for power protection, automation and control systems is limited. By embedding a communication exchanger into an IED, a reduction of total space used for the system and wiring complexity can be achieved.

While the invention has been described in terms of various specific embodiments, those skilled in the art will recognize that the invention can be practiced with modification within the spirit and scope of the claims.

What is claimed is:

1. A system comprising:
    an intelligent electronic device (IED) for communication with at least one other IED external to said IED, said IED comprising:
        at least one of a current, voltage, resistive or binary status input;
        a control output configured to, using controlling circuitry, output a signal to control a process protection, control, or automation, or a combination thereof, or a control output configured to output a digitally encoded serial communication package to control protection, control, or automation, or a combination thereof;
        an embedded communication exchanger physically located within and electrically interconnected with said IED for facilitating peer-to-peer communication between the IED and said at least one other IED comprising:
            an internal communication port for directly connecting the IED to the embedded communication exchanger and an external port for directly connecting the IED to the embedded communication exchanger;
            a plurality of ports configured to connect the embedded communication exchanger to said at least one other IED, wherein said IED is a destination device and said at least one other IED is an originating device and wherein the embedded communication device is configured to direct communication packets from the originating device to the destination device using a packet directing circuit and the plurality of ports, wherein the packet directing circuit and the controlling circuitry are independently power sourced, wherein an external power is connected to either the packet directing circuit or the controlling circuit, and an internal power source is connected to the remaining one of the packet directing circuit or the controlling circuiting such that the packet directing circuit and the controlling circuitry function independently in a failure event of either the packet directing circuit or the controlling circuitry; and
        a processor connected with the input and the control output and configured to monitor a process having a state including monitoring said IED, said processor in communication with said embedded communication exchanger;
    wherein said at least one other IED also comprises at least one of a current, voltage, resistive or binary status input and a control output configured to output a signal to control a process protection, control, or automation, or a combination thereof, or a control output configured to output a digitally encoded serial communication package to control protection, control, or automation, or a combination thereof.

2. An IED in accordance with claim 1 wherein said processor is further configured to direct communication packets in accordance with addressing information carried by the packets.

3. An IED in accordance with claim 1 wherein to direct the communication packets, said processor is configured to buffer received packets within a buffer before sending the received packets when a destination port of said plurality of ports is busy.

4. An IED in accordance with claim 3 wherein said processor is further configured to tag packets with a priority and to elevate packets waiting for transmission and having high priorities be elevated in the buffer.

5. An IED in accordance with claim 1 wherein said plurality of ports are configured to utilize at least one of electrical physical connections, optical physical connections, and wireless connections.

6. An IED in accordance with claim 5 wherein said plurality of ports comprise electrical ports shared with power supply lines of said IED.

7. An IED in accordance with claim 1, wherein said IED further comprises:
    a memory internal to said IED, said packet directing circuit is controlled by one of firmware and software residing in the memory.

8. An IED in accordance with claim 7 wherein the firmware and the software are independently modifiable.

9. An IED in accordance with claim 1 further comprising an internal clock, said IED is configured to synchronize said internal clock using a timing signal received via one port of said plurality of ports.

10. An IED in accordance with claim 9 wherein said internal clock comprises one of a time and date clock and a sampling clock.

11. An IED in accordance with claim 1 wherein said processor is configured to:
    alter a transmit signal for a given port of said plurality of ports in response to a failure of a receive signal of the given port; and
    force a connected IED to switch transmission from the given port to an alternate port of said plurality of ports.

12. An IED in accordance with claim 1 wherein said plurality of ports are configured for a plurality of different media and a plurality of different protocols.

13. An IED in accordance with claim 1 wherein at least one port of said plurality of ports is configured to communicate at least one of encrypted information and manage security of the encrypted communication.

14. A network comprising:
    at least one originating device that is an intelligent electronic device (IED) comprising:
        at least one of a current, voltage, resistive or binary status input; and
        a control output configured to, using control circuitry, output a signal to control a process protection, control, or automation, or a combination thereof, or a control output configured to output a digitally encoded serial communication package to control protection, control, or automation, or a combination thereof;
    at least one destination device that is an IED comprising:
        at least one of a current, voltage, resistive or binary status input;
        a control output configured to output a signal to control a process protection, control, or automation, or a combination thereof, or a control output configured to output a digitally encoded serial communication package to control protection, control, or automation, or a combination thereof; and at least one IED comprising:

at least one of a current, voltage, resistive or binary status input;

a control output configured to output a signal to control a process protection, control, or automation, or a combination thereof, or a control output configured to output a digitally encoded serial communication package to control protection, control, or automation, or a combination thereof;

an embedded communication exchange switch physically located within and electrically interconnected with said at least one IED for facilitating peer-to-peer communication between said at least one originating device and said at least one destination device comprising:

an internal communication port for providing direct access to the embedded communication exchanger from the IED and an external communication port for providing direct access to the embedded communication exchanger from the IED;

a plurality of ports configured to connect the embedded communication exchanger to the at least one originating device and the at least one destination device and wherein the embedded communication exchange switch is configured to direct communication packets from the originating device to the at least one destination device using a packet directing circuit and the plurality of ports, wherein the packet directing circuit and the controlling circuitry are independently power sourced, wherein an external power is connected to either the packet directing circuit or the controlling circuit, and an internal power source is connected to the remaining one of the packet directing circuit or the controlling circuiting such that the packet directing circuit and the controlling circuitry function independently in a failure event of either the packet directing circuit or the controlling circuitry; and a processor connected with the input and the control output of said at least one IED and configured to monitor a process having a state including monitoring said at least one IED, said processor being in communication with said embedded communication exchanger.

15. A network in accordance with claim 14 wherein said network comprises a plurality of IEDs, said network is compatible with each IED of said plurality of IEDs, said at least one originating device, and said at least one destination device, said at least one originating device and said at least one destination device connected directly to at least one IED of said plurality of IEDs.

16. A network in accordance with claim 14 wherein said network is a self-healing network.

17. A network in accordance with claim 14 wherein said network comprises one of a star network, a ring network, and a daisy-chain network.

18. An IED in accordance with claim 1 further comprises at least one of:
- at least one of a current input, a voltage input, a resistive input, a binary status input configured to monitor the state of the process;
- at least one binary status input configured to receive a digitally encoded serial communication package for monitoring the state of the process;
- at least one control output configured to output a signal to control at least one of process protection, control, and automation; and
- at least one control output configured to output a digitally encoded serial communication package to at least one of control protection, control, and automation.

19. An IED in accordance with claim 7 wherein said packet directing circuit is configured to direct communication between the originating device and the destination device, and wherein said controlling circuitry is configured to perform other functions of said processor.

* * * * *

UNITED STATES PATENT AND TRADEMARK OFFICE
CERTIFICATE OF CORRECTION

PATENT NO. : 8,730,834 B2  Page 1 of 1
APPLICATION NO. : 11/317477
DATED : May 20, 2014
INVENTOR(S) : Marusca et al.

It is certified that error appears in the above-identified patent and that said Letters Patent is hereby corrected as shown below:

In the Specification

In Column 3, Line 6, delete "improves" and insert -- improve --, therefor.

In Column 4, Line 62, delete "LE-DIED" and insert -- IED --, therefor.

In Column 5, Lines 16-17, delete "Ethernet ports 300. Relay 100" and insert -- an Ethernet port 330. Relay 500 --, therefor.

In Column 5, Line 18, delete "Ethernet ports 301." and insert -- an Ethernet port 331. --, therefor.

In Column 5, Line 20, delete "Ethernet ports 302." and insert -- an Ethernet port 332. --, therefor.

In Column 5, Line 22, delete "Ethernet ports 303." and insert -- an Ethernet port 333. --, therefor.

In Column 5, Lines 24-25, delete "Ethernet switch or hub 512 using internal connection 402, or external" and insert -- an Ethernet switch or hub 512 using an internal connection 527, or an external --, therefor.

In Column 5, Line 27, delete "IED 103." and insert -- IED 103. Ethernet switch or hub 512 is an example of communication exchanger 204. --, therefor.

In Column 5, Line 31, delete "port 304." and insert -- ports 304. --, therefor.

In Column 5, Line 33, delete "hub 204" and insert -- hub 512 --, therefor.

In Column 7, Line 2, delete "improves" and insert -- improve --, therefor.

Signed and Sealed this
Fifteenth Day of July, 2014

Michelle K. Lee
*Deputy Director of the United States Patent and Trademark Office*